Patented Mar. 2, 1926.

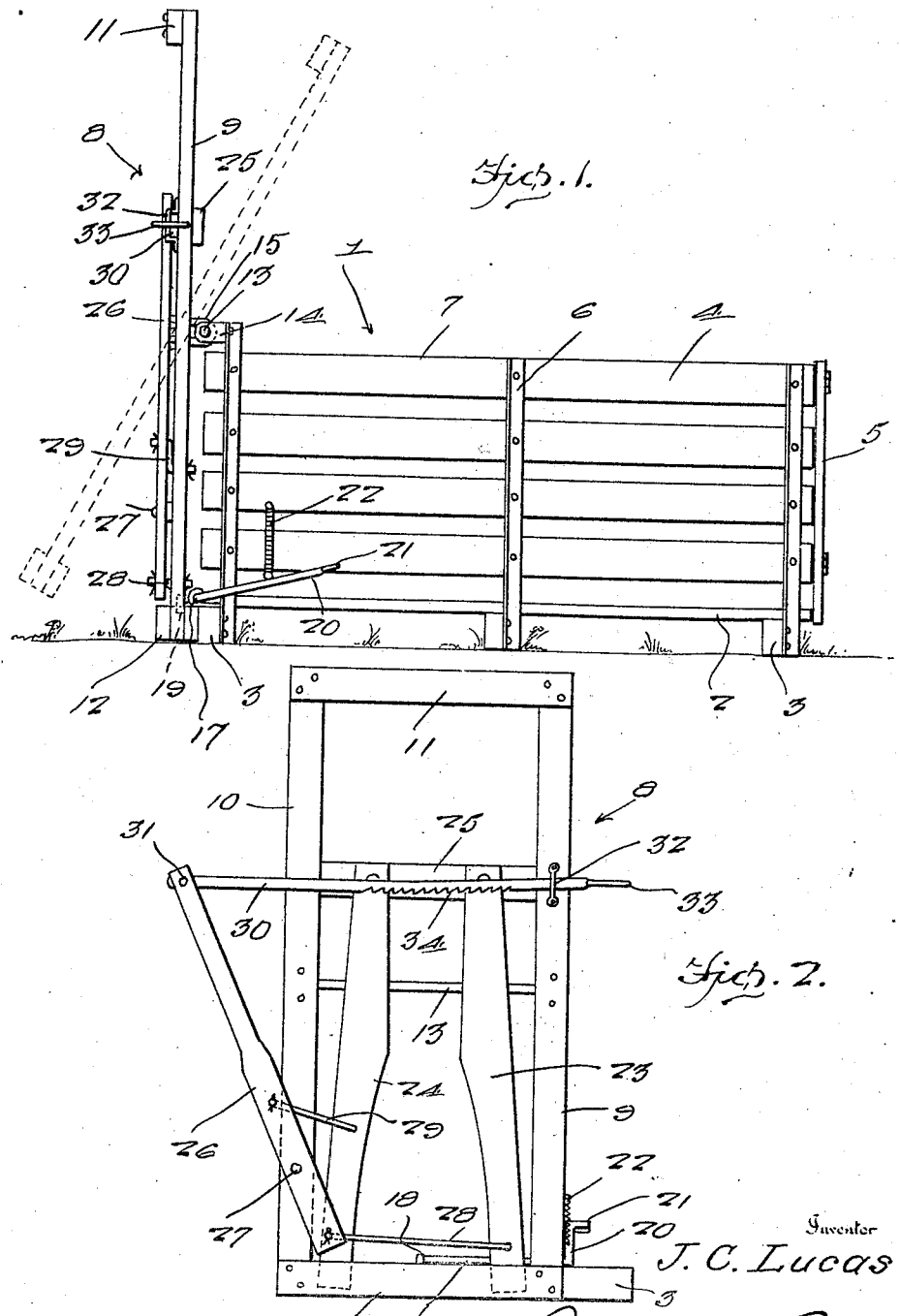

1,574,828

UNITED STATES PATENT OFFICE.

JOSEPH CLAUD LUCAS, OF BLANDINSVILLE, ILLINOIS.

HOG TRAP.

Application filed August 10, 1925. Serial No. 49,348.

*To all whom it may concern:*

Be it known that JOSEPH CLAUD LUCAS, a citizen of the United States, residing at Blandinsville, in the county of McDonough and State of Illinois, has invented certain new and useful Improvements in a Hog Trap, of which the following is a specification.

This invention relates to improvements in traps and is more particularly adapted for use in holding hogs while the same are being vaccinated, or treated with worm medicine, or when the hogs are being ringed.

A further object is to provide a hog trap of the above mentioned character which includes a crate or a pen the forward end thereof being open, and a head stock being pivotally supported on the open forward end of the housing, adjustable cooperating jaws being arranged in the head stock whereby the head of the hog will be clamped when the head is positioned in the head stock.

A further object is to provide a hog trap of the above mentioned character wherein means is associated with the pivoted head stock for locking the same against swinging movement, said head stock adapted to swing upwardly on its pivot when said locking means is released so as to facilitate the raising of the front part of the body of the hog in order that easy access thereto may be had.

A further object is to provide a hog trap of the above mentioned character which is simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:—

Figure 1 is a side elevation of the trap embodying my invention, and

Figure 2 is a front end elevation.

In the drawing, wherein for the purpose of illustration is shown a preferred embodiment of my invention, the numeral 1 designates generally my improved hog trap the same comprising a housing or pen which includes a bottom 2, the latter resting on the transversely extending parallel spaced beams 3 and the vertical sides 4. The respective ends of the housing or pen are open and a hinged gate 5 provided a closure for the rear end of the pen. Each of the sides of the pen includes the angle iron standards 6 the lower ends of which are secured to the respective cross beams 3 and these standards extend vertically in proper spaced relation with respect to each other. A plurality of spaced boards 7 extend across the angle iron standards and are secured thereto in any suitable manner.

The head stock is designated generally by the numeral 8 and comprises a rectangularly shaped frame which includes the vertical side members 9 and 10 and the upper and lower cross members 11 and 12, respectively. The frame 8 is of the same width as the width of the pen and this frame is pivotally supported intermediate its ends to the top of the forward end of the pen through the medium of the transversely extending rod 13 the latter being supported at respective ends in suitable laterally extending ears 14 which are carried by the upper ends of the forward pair of angle iron members 6, the upper ends of which extend slightly above the upper edges of the uppermost boards of the sides of the pen, suitable loops 15 being carried by the rear faces of the sides 9 and 10 of the frame through which the rod 13 extends. The purpose of pivotally supporting the head stock on the upper forward end of the frame will be hereinafter more fully described.

For the purpose of locking the head stock against upward swinging movement, there is provided a suitable locking rod the intermediate portion of which extends longitudinally on top of the forward cross beam 3 as indicated at 16, a suitable bearing 17 being provided therefor as shown more clearly in Figure 1. The forward end of the rod is bent to provide a hook 18 which is adapted for engagement with a suitable recess 19 provided therefor in the intermediate portion of the lower cross piece 12 of the frame of the head stock. The opposite end of the rod is disposed rearwardly as at 20 and thence laterally as at 21 to provide a foot engaging lever for disengaging the hook 18 from the recess 19. A coil spring 22 cooperates with the side of the pen and the rearwardly extending portion 20 of the lever for normally holding the hook in its locked position.

A pair of cooperating clamping jaws 23 and 24, respectively, are pivotally supported at their upper ends on the transversely extending cross piece 25 which is disposed across the rear faces of the sides 9 and 10 at a point adjacent the upper end thereof and above the pivot rod 13. An elongated lever 26 is pivotally supported adjacent its lower end as at 27 on the front face of the lower portion of the side 10 of the frame of the head stock 8. The lower end of this lever is operatively connected to the lower free end of the jaw 23 through the medium of the crank 28. A similar crank 29 affords a connection between the intermediate portion of the coacting jaw 24 and the intermediate portion of the lever 26 at a point above the pivot 27.

A lever actuating member 30 is pivotally connected at one end to the upper end of the lever 26 as at 31. This actuating member extends transversely across the front face of the frame of the head stock 8 across the upper front faces of the coacting jaws 23 and 24 through a keeper 32 which is secured on the front face of the side 9 of the frame 8. A handle 33 is provided on the free end of the actuating member 30. Ratchet teeth 34 are formed in the lower edge of the actuating member 30 and cooperate with the keeper 32 in holding the actuating member in any adjusted position.

The operation of the cooperating jaws may be described as follows:—The hog to be treated enters the pen through the rear end, and after the hog is within the housing, the hinged gate 5 is closed. The head stock 8 is normally in the position shown in Figure 1 and is held in a locked position against upward swinging movement in the manner heretofore more fully described. When the jaws are open, as shown in Figure 2, sufficient room is provided whereby the head of the hog will extend between the jaws and by grasping the handle 33 and exerting a pull in the direction toward the operator, the lever 26 will swing on its pivot 27 and simultaneously cause the jaws 23 and 24 to be brought into clamped engagement around the head of the animal, the crank 28 and 29 permitting the simultaneous operation of the clamping jaws either in an open or closed position. The ratchet teeth 34 will cooperate with the keeper 32 for holding the jaws in their clamped cooperative relation and thereby the head of the hog will be secured in the head stock. By stepping on the lateral extension 21 of the lever 20, against the tension of the coil spring 22, the hook 18 will be raised upwardly from engagement with the recess 19 provided in the top face of the lower end 12 of the frame and the frame will then be adapted to swing upwardly on its pivot to the position shown in dotted lines in Figure 1 so that the forward portion of the body of the hog will be raised to permit ready access thereto so that the hog may be vaccinated, or have worm medicine administered, or for any other purpose necessary in treating the animal.

After the animal has been treated, the jaws 23 and 24 are opened so as to be removed from engagement with the head of the animal, and by opening the gate 5 the hog will be permitted to leave the pen. By raising the frame of the head stock clear of the forward end of the pen, the animal may also leave the pen from the front thereof.

It will thus be seen from the foregoing description that a hog trap has been provided which will permit a person to treat a hog while the latter is held in the pen thus saving considerable time and labor. The simplicity in which the present device is constructed enables the same to be readily and easily operated and will furthermore be strong and durable and inexpensive.

While I have shown the preferred embodiment of my invention, it is to be understood that various changes in the size, shape and arrangement of parts may be resorted to without departing from the spirit or sacrificing any of the advantages of the appended claims.

What I claim is:—

1. A hog trap comprising a pen open at its forward end, an upwardly swinging head stock pivotally supported at the top of the forward end of the pen, means for holding the head stock in a closed position, said head stock comprising a frame, a pair of coacting clamping jaws pivotally supported at their upper ends on the frame, a lever pivotally supported adjacent its lower end on the frame, a crank connecting the lower end of the lever with the lower end of one of said clamping jaws, and additional cranks connecting the intermediate portion of the other clamping jaw with the intermediate portion of said lever whereby said clamping jaws are adapted for simultaneous operation when the lever is actuated.

2. A hog trap comprising a pen open at its forward end, an upwardly swinging head stock pivotally supported at the top of the forward end of the pen, means for holding the head stock in a closed position, said head stock comprising a frame, a pair of coacting clamping jaws pivotally supported at their upper ends on the frame, a lever pivotally supported adjacent its lower end on the frame, a crank connecting the lower end of the lever with the lower end of one of said clamping jaws, and additional cranks connecting the intermediate portion of the other clamping jaw with the intermediate portion of said lever whereby said clamping jaws are adapted for simultaneous operation when the lever is actuated, and means for actuating said lever.

3. A hog trap comprising a pen open at its forward end, an upwardly swinging head stock pivotally supported at the top of the forward end of the pen, means for holding the head stock in a closed position, said head stock comprising a frame, a pair of coacting clamping jaws pivotally supported at their upper ends on the frame, a lever pivotally supported adjacent its lower end on the frame, a crank connecting the lower end of the lever with the lower end of one of said clamping jaws, and additional cranks connecting the intermediate portion of the other clamping jaw with the intermediate portion of said lever whereby said clamping jaws are adapted for simultaneous operation when the lever is actuated, and means for actuating said lever, said means comprising an operating member pivotally connected at one end to the upper end of the lever, said operating member extending transversely across the front of the frame, and a handle provided on the free end of the actuating member.

In testimony whereof I affix my signature.

JOSEPH CLAUD LUCAS.